Dec. 13, 1966 J. H. BROWN ETAL 3,292,010
CAPACITOR DRIVEN SWITCH
Filed March 10, 1964

INVENTORS.
JAMES H. BROWN
W. J. WESTER
BY
H. H. Losche
ATT'YS.

United States Patent Office 3,292,010

Patented Dec. 13, 1966

3,292,010
CAPACITOR DRIVEN SWITCH

James H. Brown, Severna Park, and William J. Wester, Glen Burnie, Md., assignors, by mesne assignments, to the United States of America as represented by the Secretary of the Navy Filed Mar. 10, 1964, Ser. No. 350,926
10 Claims. (Cl. 307—88.5)

Figure 1:
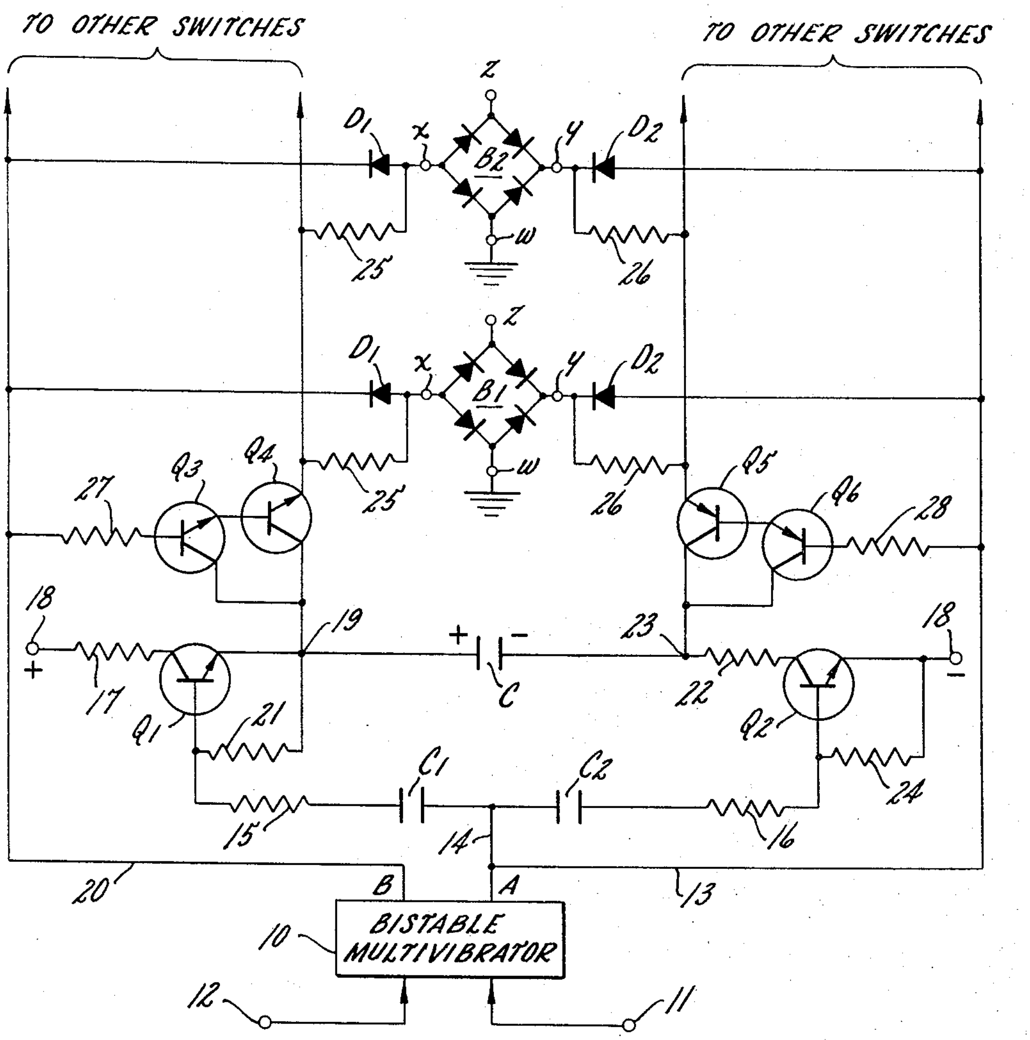

This invention relates to solid state switches and more particularly to solid state switches which are given by the voltage supplied from a storage capacitor, and the switching and capacitor charging functions are controlled by a bistable multivibrator with the capacitor charging voltage being supplied from a source independent of the switching circuit.

When a solid state switch is used in a commutator or a clamping circuit, the offset voltages across the switch due to the switch driving circuits may be kept as low as possible. It is necessary to use some form of floating power supply to provide the driving current for the switch. Many times a capacitor is used in lieu of a power supply and this capacitor is charged by a switch driver such as a bistable multivibrator circuit and the capacitor is discharged through the control circuits of the switch. Such switch driving circuits have disadvantages, the three most important disadvantages being set forth herein. First, the capacitor circuits are usually not efficient requiring more charging current than can be discharged through the circuit. Second, the capacitor is charged by the multivibrator circuit requiring considerable power from these devices. Third, the time that a capacitor driven switch of this type can be held "on" depends on the amount of charge that can be placed on the capacitor during the "off" period. This implies that such a switch should be used in systems where the "off" period of the switch is much greater than the "on" period.

In the present invention the above disadvantages are overcome by the particular construction and arrangement of the switching circuits and of means to charge a floating power supply, such as a capacitor, from a separate voltage source so as not to load a bistable multivibrator producing the switching functions. In this invention, switches having a switch circuit and a control circuit, such as diode bridge switches or transistor switches, are coupled to a bistable multivibrator device for switching functions. The multivibrator also switches a pair of transistors in one bistable output condition to charge a floating voltage supply, such as a storage capacitor, and at the same time to back-bias the diode or transistor switches. Under the other bistable output condition the transistors used for charging the storage capacitor are cut "off," the bistable multivibrator circuit outputs to the switching devices are cut "off" by diode means, and other switching transistors in the circuit between the storage capacitor and the diode or transistor switches are turned "on" to discharge the storage capacitor through the control circuits of the diode or transistor switches. The discharge of the storage capacitor forward biases the diode bridge or transistor switches which turns the switching circuits therethrough to a conductive state during the period of discharge of the storage capacitor. The storage capacitor is charged through the pair of transistors from a separate voltage supply source which does not cause any additional load on the bistable multivibrator. The switches, accordingly, are switched "on" and "off" in accordance with the switching of the bistable multivibrator. The switches, such as the diode bridge switching circuits or the transistor switching circuits, may be placed in parallel to produce as many switches as desired or needed under the control of a single storage capacitor and a single bistable multivibrator. The diode bridge switching circuits and the transistor switching circuits may be used interchangeably and in any number combination in the parallel circuitry from the storage capacitor. It is also to be understood that the bistable multivibrator may be used for any number of switches or one bistable multivibrator may be used for each switch, as desired. It is therefore a general object of this invention to provide a diode bridge switching circuit or a transistor switching circuit controlled in its switching function by a storage capacitor that is charged from an independent voltage source and switched in its charging and discharging sequence by the control of a bistable multivibrator.

Figure 2:
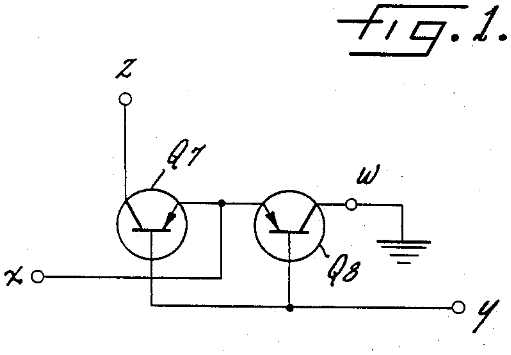

These and other objects and the attendant advantages, features, and uses of the invention may become more apparent as the description proceeds when considered along with the accompanying drawing in which:

FIGURE 1 is a circuit schematic diagram of the invention with one element shown in block; and FIGURE 2 illustrates a circuit schematic of a modified switch which may be used in the place of the switch or switches used in FIGURE 1.

Referring more particularly to FIGURE 1, a bistable multivibrator 10 is shown as having two inputs 11 and 12 for applying switching pulses to the multivibrator 10 and as having two outputs A and B. Under one bistable state of the multivibrator 10 the output of A will be a positive voltage while the output of B will be a negative voltage. Under the opposite bistable state of the multivibrator 10 the output B will be positive and the output A will be negative. The output A of the multivibrator 10 is coupled through one branch conductor 13 to the anode of a diode D2, the cathode of which is coupled to one terminal *y* of a diode bridge switch B1. The other branch conductor 14 of output A from the multivibrator 10 is applied to one plate each of two capacitors C1 and C2 the opposite plates of each being coupled through resistors 15 and 16, respectively, to the base electrodes of transistors Q1 and Q2, respectively. The output B of multivibrator 10 is coupled by way of conductor means 20 to the cathode of a diode D1, the anode of which is coupled to the terminal *x* of the diode bridge switch B1.

The transistor Q1 has its collector coupled through a resistor 17 to a positive voltage source 18 and its emitter coupled to one terminal 19 of a storage capacitor C. The emitter and base are coupled through a base biasing resistor 21. The transistor Q2 has its emitter coupled to the opposite pole of the voltage source 18 and its collector coupled through a resistance 22 to the opposite terminal 23 of the storage capacitor C. The emitter of transistor Q2 is coupled through a base biasing resistor 24 to the base electrode. The transistors Q1 and Q2 are of NPN type so that whenever a positive voltage is applied to the bases thereof the transistors Q1 and Q2 will be rendered conductive to connect the terminals of voltage source 18 across the plates of storage capacitor C. As shown in FIGURE 1, when storage capacitor C is connected to the voltage source 18 it will charge as shown by the positive and negative symbols near the plates thereof. When transistors Q1 and Q2 are cut off, the storage capacitor C will retain the charge and will operate as a floating power supply since it is not resting with respect to any voltage reference.

One plate of the storage capacitor C is coupled through a pair of switching transistors Q3 and Q4 to the *x* terminal of the diode bridge switch B1 through a resistance 25 while the negative terminal 23 of the storage capacitor C is coupled through the switching transistors Q5 and Q6 to the terminal *y* of the diode bridge switch B1 through the resistance 26. The transistors Q3 and Q4 have their collectors coupled in common to the terminal 19 of storage capacitor C, the emitter of transistor Q3 being coupled directly to the base of transistor Q4 and the emitter of transistor Q4 being coupled through resistor 25 to the terminal *x*. The base of transistor Q3 is coupled through a resistor 27 to the conductor 20, or output B of the multivibrator 10. In like manner the collectors of transistors Q5 and Q6 are coupled in common to the negative terminal 23 of storage capacitor C, the emitter of Q6 is coupled directly to the base of transistor Q5, and the emitter of transistor Q5 is coupled to terminal *y* through the resistor 26. The base of transistor Q6 is coupled through a resistance 28 to the branch conductor 13 of the output A of multivibrator 10. Transistors Q3 and Q4 are of NPN type while transistors Q5 and Q6 are of the PNP type to provide a circuit from the positive plate 19 of storage capacitor C through the control circuit of the diode bridge switch B1 and through transistors Q5 and Q6 to the negative terminal, as will later be made clear in the description of operation.

The diode bridge switch B1 has control circuit input terminals *x* and *y* as hereinbefore described and a switch circuit there-through from *z* to *w*, the circuit of *z* to *w* being in a voltage circuit to be switched, as desired. As shown in FIGURE 1 the *w* terminal may be the neutral voltage to be switched and, accordingly, is shown as being grounded herein. As many diode bridge switches as desired or necessary may be coupled in parallel to the multivibrator outputs 13 and 20 and to the emitters of transistors Q4 and Q5 as shown, there being two such switches B1 and B2 shown herein for the purpose of example. The number of switches B1, B2, etc., used in the circuit may have the resistors 25 and 26 chosen to discharge the storage capacitor C in a predetermined time and in accordance with the number of switches used. Any equipment for commutator or clamping circuit purposes may be coupled to the terminals *z* and *w* for switching in accordance with this invention.

Referring more particularly to FIGURE 2, there is illustrated a transistor switch which may replace the diode bridge switches B1, B2, etc., in the circuit of FIGURE 1. The transistor switch is shown consisting of two transistors Q7 and Q8 of the PNP type having the emitters thereof coupled in common to terminal *x*. The base electrodes are likewise coupled in common to terminal *y*. The collector of transistor Q7 is coupled to terminal *z* while this collector of transistor Q8 is coupled to terminal *w* of the neutral or ground potential, as desired for circuit design. The transistor switch of FIGURE 2 may replace any one or more of the diode switches B1, B2, etc., in the circuit of FIGURE 1 by connecting the *x*, *y*, *z*, and *w* terminals in FIGURE 1.

OPERATION

In the operation of the devices shown in FIGURE 1, let it be assumed first that the bistable multivibrator 10 is in the bistable state in which a positive voltage is conducted over the output A and a negative voltage is conducted over the output B. The positive voltage will be conducted by way of the branch conductor 14 to the base electrodes of transistors Q1 and Q2 placing these transistors in the conducting state thereby connecting the storage capacitor C in circuit with the supply voltage applied at terminals 18 to cause the storage capacitor C to charge, as shown by the positive and negative symbols, across the plates thereof in FIGURE 1. At the same time the positive voltage over the branch conductor 13 will be applied through resistor 28 to the base of transistor Q6 to back-bias transistors Q5 and Q6 placing them in a cutoff condition. The positive voltage of output A will be conducted through the diode or diodes D2 to the terminal *y* of the diode bridge switches. The negative output B of multivibrator 10 is applied through the resistor 27 to the base of transistor Q3 biasing transistors Q3, Q4 to a cutoff condition. In like manner the negative output voltage B is conducted by way of the diodes D1 to the *x* terminal of the diode bridge switches causing these switches to be back-biased by virtue of a negative voltage at *x* and a positive voltage at *y*. The diode bridge switches B1, B2 therefore will be open circuits for the switch circuit through terminals *z* and *w*.

Under the condition in which the bistable multivibrator 10 is switched to the opposite stable state to produce a positive voltage on the output B and a negative voltage on the output A, the negative voltage from output A will be applied to the base electrodes of transistors Q1 and Q2 to immediately open the circuit from the voltage supply applied at terminal 18 to the storage capacitor C. Also, a negative voltage now will be applied to the anodes of diodes D2 and a positive voltage will be applied to the cathode of the diodes D1 thereby isolating the diode bridge switches B1 and B2 from the voltage outputs A and B from multivibrator 10. The positive voltage from output B of multivibrator 10 will be applied through resistor 27 to the base of transistor Q3 which in turn will be applied through the emitter to the base of transistor Q4 placing these transistors in a conductive state to apply voltage from the positive plate at terminal 19 from storage capacitor C through the resistor 25 to terminal *x* of the diode bridge switches. In like manner the negative voltage from output A of the multivibrator 10 will be applied through the resistor 28 to the base of transistor Q6 and through the emitter to the base of transistor Q5 placing these transistors in a conductive state to connect terminal *y* of the diode bridge switch through the resistor 26 to the negative terminal 23 of storage capacitor C. Positive voltage will now be applied at terminal *x* and negative voltage will be applied at terminal *y* of each diode bridge switch forward biasing these diodes in the switch to close the circuit from terminal *z* to terminal *w*. The diode switches B1 and B2 will be biased forward and turned "on" as long as the storage capacitor C is being discharged. The discharge rate of storage capacitor C can be controlled by the resistances 25 and 26 in accordance with the number of diode switches B1, B2, etc., as are placed in parallel. While only one transistor in place of the two transistors Q4 and Q5 may be used in the discharge path in the control circuit of the diode bridge switches, two or more are recommended for proper operation to avoid impedance to discharge by way of the transistors Q3 through Q6. Multivibrator 10 may be used with only one diode bridge circuit such as B1 or any block of diode bridge circuits as desired to accomplish switching for commutator or clamping circuit functions.

The operation of the circuit in FIGURE 1 will remain unchanged with the substitution of the transistor switches as shown in FIGURE 2 in place of the diode bridge switches B1 and B2. For example of operation, when output A is positive and output B is negative from the multivibrator 10, terminal *y* will be positive and terminal *x* will be negative causing complete cutoff of transistors Q7 and Q8. Under this condition the circuit from *z* to *w* will be open. Now under the condition in which the output B is positive and the output A is negative from multivibrator 10, terminal *x* will be positive and terminal *y* will be negative in FIGURE 2 to forward bias the transistors Q7 and Q8 and thereby close the circuit from *z* to *w*. The transistor switches may replace any one or more of the diode bridge switches B1, B2 without changing the operational effects of switching for commutating or clamping circuits, as may be desired. The switches B1, B2, as shown in FIGURE 2 being in parallel, will be switched in accordance with the switching signals applied at terminals 11 and 12 of multivibrator 10 to switch the multivibrator to either of its two bistable states.

While many modifications and changes may be made in the constructional details and features of this invention without departing from the spirit and scope of the invention, it is to be understood that we desire to be limited only in the scope of the appended claims.

We claim:

1. A capacitor driven switch comprising:

a voltage controlled switch means having a control circuit and a switch circuit;

a storage capacitor coupled in parallel to said control circuit of said switch means;
a first electron emission means in said parallel coupling and having a control electrode;
a voltage source coupled to charge said storage capacitor;
a second electron emission means in the coupling of said voltage source and said capacitor, said second electron emission means having a control electrode to control the connection of said voltage source to said capacitor;
a polarity reversing means coupled to the control electrodes of said first and second electron emission means and through unidirectional means to the control circuit of said switch means to apply voltage of a polarity alternately to said first and second electron means and said switch means whereby under one polarity output of said polarity reversing means the switch circuit of said switch means is open, said first electron emission means is nonconductive, and said second electron emission means is conductive to charge said storage capacitor, and under the other polarity condition said second electron emission means is nonconductive and said first electron emission means is conductive to apply stored voltage on said storage capacitor to said control circuit of said switch means to close said switch circuit.

2. A capacity driven switch as set forth in claim 1 wherein
said control circuit of said switch means includes an input and an output to said switch means, and
said polarity reversing means is a bistable multivibrator and said unidirectional means are diodes, one each diode for the input and the output control circuit of said switch means and being oriented in opposite low impedance directions with respect to said switch means.

3. A capacitor driven switch as set forth in claim 2 wherein
said first and second electron emission means are transistors in which the base electrodes are said control electrodes.

4. A capacitor driven switch as set forth in claim 3 wherein
said voltage controlled switch means are diode bridge switches.

5. A capacitor driven switch as set forth in claim 1 wherein
said voltage controlled switch means are paired transistors, each pair having the emitters coupled in common and the bases coupled in common, the base and emitter common coupling constituting said control circuit and the emitters and collectors constituting said switch circuit.

6. A capacitor driven switch comprising:
a switch means having a control circuit therethrough and a switch circuit therethrough;
a storage capacitor coupled in parallel to said control circuit on opposite inputs of said switch means;
first and second transistor means, the first transistor means having emitter and collector electrodes in the coupling between said storage capacitor and one control circuit input of said switch means and the second transsitor means having emitter and collector electrodes in the coupling between said storage capacitor and the other control circuit input of said switch means, and each transistor means having a base electrode input;
a voltage source coupled across said capacitor to charge same;
third and fourth transistor means, the third transistor means having its emitter and collector coupled between one pole of said voltage source and one plate of said capacitor and the fourth transistor means having its emitter and collector coupled between the other pole of said voltage source and the other plate of said storage capacitor, each transistor means having a base electrode coupled in common; and
a bistable multivibrator having two outputs of opposite polarity voltage that is reversible in alternate stable conditions, one output being coupled through a diode that is anode coupled to said one control circuit input of said switch means and to the base electrode of said first transistor means, and the other output being coupled through a diode that is cathode coupled to said other control circuit input of said switch means and to the base electrode of said second transistor means and the common base electrodes of said third and fourth transistor means to hold said switch circuit open under one polarity condition of said bistable multivibrator, said first and second transistor means in a nonconductive state, and said third and fourth transistor means in a conductive state to charge said storage capacitor to the amplitude of said voltage source, and to condition said third and fourth transistor means to a nonconductive state in the other polarity condition of said bistable multivibrator and said first and second transistor means in the conductive state to discharge said storage capacitor through the control circuit of said switch means to close said switch circuit thereof whereby said switch means are switched in accordance with the bistable state of said multivibrator, said switch circuit closing of said switch means being controlled by the discharge of said storage capacitor.

7. A capacitor driven switch as set forth in claim 6 wherein
said switch means include a plurality of diode bridge switches in parallel.

8. A capacitor driven switch as set forth in claim 6 wherein
said switch means include a plurality of transistor switches in parallel.

9. A capacitor driven switch as set forth in claim 6 wherein
said first and second transistor means are each a plurality of transistors having their collectors coupled in common and the emitter of the first coupled to the base of the next in sequence of said plurality, said emitter-to-base coupling continuing through said sequence of transistors to the last transistor.

10. A capacitor driven switch as set forth in claim 9 wherein
said coupling of said other output of said bistable multivibrator to said common coupling of said base electrodes of said third and fourth transistor means is through capacitive and resistive elements, and
said couplings of said storage capacitor to said switch means control circuit through said first and second transistor means is through resistance elements.

References Cited by the Examiner

UNITED STATES PATENTS

| | | | |
|---|---|---|---|
| 2,888,579 | 5/1959 | Wanlass | 307—88.5 |
| 2,970,227 | 1/1961 | Horton et al. | 307—88.5 |
| 3,025,411 | 3/1962 | Rumble | 307—88.5 |
| 3,231,752 | 1/1966 | Jacob | 307—88.5 |

FOREIGN PATENTS

| | | |
|---|---|---|
| 195,967 | 2/1958 | Germany. |

ARTHUR GAUSS, *Primary Examiner.*

B. P. DAVIS, *Assistant Examiner.*